(12) United States Patent
Owen

(10) Patent No.: US 8,615,509 B2
(45) Date of Patent: Dec. 24, 2013

(54) ABSTRACTING INFORMATION FROM A DEVICE

(75) Inventor: Russell Owen, Waterloo (CA)

(73) Assignee: BlackBerry Limited, Waterloo (CA)

( * ) Notice: Subject to any disclaimer, the term of this patent is extended or adjusted under 35 U.S.C. 154(b) by 99 days.

(21) Appl. No.: 12/635,876

(22) Filed: Dec. 11, 2009

(65) Prior Publication Data

US 2011/0145222 A1 Jun. 16, 2011

(51) Int. Cl.
*G06F 7/00* (2006.01)
*G06F 17/30* (2006.01)

(52) U.S. Cl.
USPC .......................... 707/722; 707/694; 707/769

(58) Field of Classification Search
USPC ............... 707/722, 999.007, 769, 694
See application file for complete search history.

(56) References Cited

U.S. PATENT DOCUMENTS

| | | | | |
|---|---|---|---|---|
| 6,385,602 B1 * | 5/2002 | Tso et al. | ............................... | 1/1 |
| 7,761,450 B1 * | 7/2010 | Ordonez | ....................... | 707/736 |
| 2007/0203929 A1 * | 8/2007 | Bolivar | ........................ | 707/101 |
| 2009/0299817 A1 | 12/2009 | Fok et al. | | |
| 2010/0257169 A1 * | 10/2010 | Kim et al. | ..................... | 707/737 |

FOREIGN PATENT DOCUMENTS

| WO | 2006044357 A2 | 4/2006 |
|---|---|---|
| WO | 2008072045 A2 | 6/2008 |

OTHER PUBLICATIONS

Extended European Search Report mailed Apr. 20, 2010. In corresponding application No. 09178973.5.
Address Book Sharing.; http://www.rhytha.com/software_products/images/big/ss_address_book_sharing.gif. Retrieved Feb. 29, 2012.
Office Action mailed Jul. 10, 2013, in corresponding Canadian patent application No. 2,718,817.

* cited by examiner

*Primary Examiner* — Alexey Shmatov
(74) *Attorney, Agent, or Firm* — Novak Druce Connolly Bove + Quigg LLP

(57) ABSTRACT

Requesting from a device to a source. In a device comprising a datastore, the datastore comprising a plurality of records, each record comprising a plurality of fields, retrieving a common set of fields from each of the plurality of records. The technology abstracts at least one of the retrieved fields across the plurality of records, resulting in abstracted information. The technology sends, to the source, the abstracted information from the device in place of the retrieved fields.

12 Claims, 6 Drawing Sheets

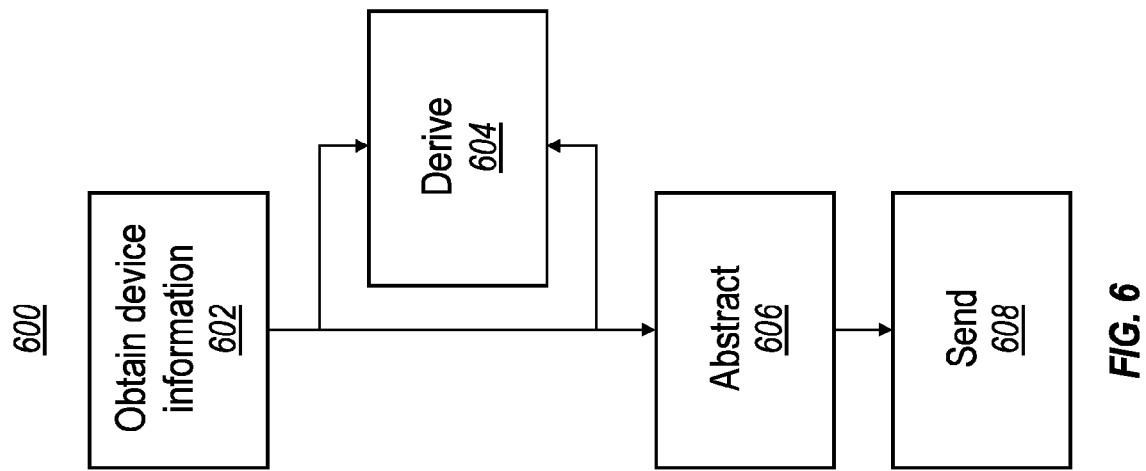

ABSTRACTING INFORMATION FROM A DEVICE

FIELD OF THE TECHNOLOGY

The technology disclosed herein relates to using information stored in a device while retaining a degree of privacy. Specific embodiments relate to devices, methods, and computer program products for leveraging information stored on a mobile communications device in a fashion that reduces the opportunity for unauthorized use of that information.

BRIEF DESCRIPTION OF THE DRAWINGS

FIG. 6 illustrates a method of the technology

DETAILED DESCRIPTION

Reference will now be made in detail to embodiments of the technology. Each example is provided by way of explanation of the technology only, not as a limitation of the technology. It will be apparent to those skilled in the art that various modifications and variations can be made in the present technology without departing from the scope or spirit of the technology. For instance, features described as part of one embodiment can be used on another embodiment to yield a still further embodiment. Thus, it is intended that the present technology cover such modifications and variations that come within the scope of the technology.

Figure 1:
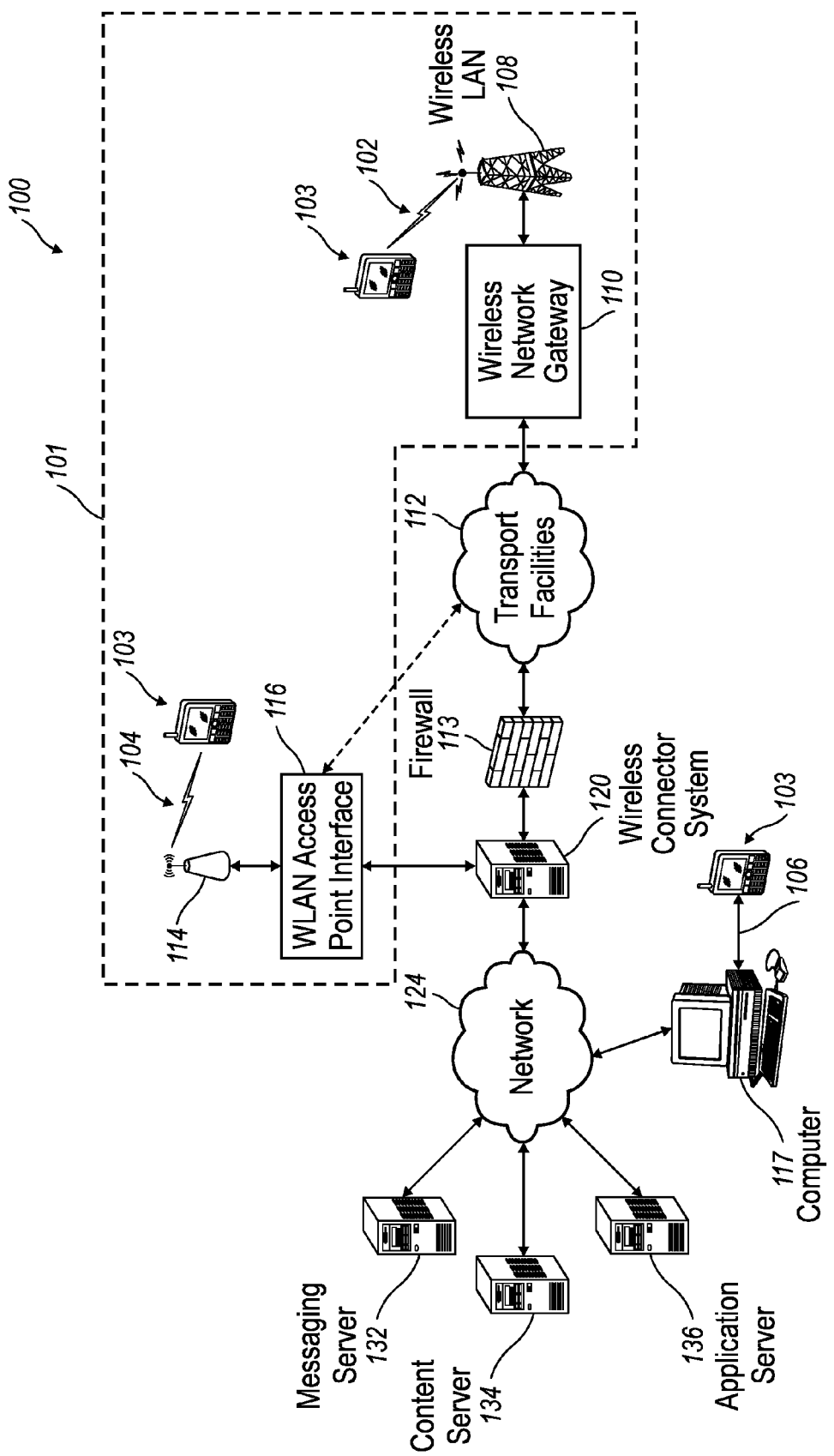
FIG. 1 illustrates a communication system including a mobile communication device to which example embodiments of the present disclosure can be applied.

In order to facilitate an understanding of environments in which example embodiments described herein can operate, reference is first made to FIG. 1 that shows, in block diagram form, a communication system 100 in which embodiments of the technology can be applied. The communication system 100 may comprise a number of mobile communication devices 103 that may be connected to the remainder of system 100 in any of several different ways. Accordingly, several instances of mobile communication devices 103 are depicted in FIG. 1 employing different example ways of connecting to system 100. Mobile communication devices 103 are connected to a wireless network 101 that may comprise one or more of a Wireless Wide Area Network (WWAN) 102 and a Wireless Local Area Network (WLAN) 104 or other suitable network arrangements. In some embodiments, the mobile communication devices 103 are configured to communicate over both the WWAN 102 and WLAN 104, and to roam between these networks. In some embodiments, the wireless network 101 may comprise multiple WWANs 102 and WLANs 104.

The WWAN 102 may be implemented as any suitable wireless access network technology. By way of example, but not limitation, the WWAN 102 may be implemented as a wireless network that includes a number of transceiver base stations 108 (one of which is shown in FIG. 1, and such as 419) where each of the base stations 108 provides wireless Radio Frequency (RF) coverage to a corresponding area or cell. The WWAN 102 is typically operated by a mobile network service provider that provides subscription packages to users of the mobile communication devices 103. In some embodiments, the WWAN 102 conforms to one or more of the following wireless network types: Mobitex Radio Network, DataTAC, GSM (Global System for Mobile Communication), GPRS (General Packet Radio System), TDMA (Time Division Multiple Access), CDMA (Code Division Multiple Access), CDPD (Cellular Digital Packet Data), iDEN (integrated Digital Enhanced Network), EvDO (Evolution-Data Optimized) CDMA2000, EDGE (Enhanced Data rates for GSM Evolution), UMTS (Universal Mobile Telecommunication Systems), HSPDA (High-Speed Downlink Packet Access), IEEE 802.16e (also referred to as Worldwide Interoperability for Microwave Access or "WiMAX"), or various other networks. Although WWAN 102 is described as a "Wide-Area" network, that term is intended herein also to incorporate wireless Metropolitan Area Networks (WMAN) and other similar technologies for providing coordinated service wirelessly over an area larger than that covered by typical WLANs.

The WWAN 102 may further comprise a wireless network gateway 110 that connects the mobile communication devices 103 to transport facilities 112, and through the transport facilities 112 to a wireless connector system 120. Transport facilities may include one or more private networks or lines, the public internet, a virtual private network, or any other suitable network. The wireless connector system 120 may be operated, for example, by an organization or enterprise such as a corporation, university, or governmental department, that allows access to a network 124 such as an internal or enterprise network and its resources, or the wireless connector system 120 may be operated by a mobile network provider. In some embodiments, the network 124 may be realized using the Internet rather than or in addition to an internal or enterprise network.

The wireless network gateway 110 provides an interface between the wireless connector system 120 and the WWAN 102, which facilitates communication between the mobile communication devices 103 and other devices (not shown) connected, directly or indirectly, to the WWAN 102. Accordingly, communications sent via the mobile communication devices 103 are transported via the WWAN 102 and the wireless network gateway 110 through transport facilities 112 to the wireless connector system 120. Communications sent from the wireless connector system 120 are received by the wireless network gateway 110 and transported via the WWAN 102 to the mobile communication devices 103.

The WLAN 104 comprises a wireless network that, in some embodiments, conforms to IEEE 802.11x standards (sometimes referred to as Wi-Fi™) such as, for example, the IEEE 802.11a, 802.11b and/or 802.11g standard. Other communication protocols may be used for the WLAN 104 in other embodiments such as, for example, IEEE 802.11n, IEEE 802.16e (also referred to as Worldwide Interoperability for Microwave Access or "WiMAX"), or IEEE 802.20 (also referred to as Mobile Wireless Broadband Access). The WLAN 104 includes one or more wireless RF Access Points (AP) 114 (one of which is shown in FIG. 1) that collectively provide a WLAN coverage area.

The WLAN 104 may be a personal network of the user, an enterprise network, or a hotspot offered by an internet service provider (ISP), a mobile network provider, or a property owner in a public or semi-public area, for example. The access points 114 are connected to an access point (AP) interface 116 that may connect to the wireless connector system 120 directly (for example, if the access point 114 is part of an enterprise WLAN 104 in which the wireless connector system 120 resides), or indirectly as indicated by the dashed line in FIG. 1 via the transport facilities 112 if the access point 114 is a personal Wi-Fi network or Wi-Fi hotspot (in which case a mechanism for securely connecting to the wireless connector system 120, such as a virtual private network (VPN), may be used). The AP interface 116 provides translation and routing services between the access points 114 and the wireless connector system 120 to facilitate communication, directly or indirectly, with the wireless connector system 120.

The wireless connector system 120 may be implemented as one or more servers, and is typically located behind a firewall 113. The wireless connector system 120 manages communications, including email communications, to and from a set of managed mobile communication devices 103. The wireless connector system 120 also provides administrative control and management capabilities over users and mobile communication devices 103 that may connect to the wireless connector system 120.

The wireless connector system 120 allows the mobile communication devices 103 to access the network 124 and connected resources and services such as a messaging server 132 (for example, a Microsoft Exchange, IBM Lotus Domino, or Novell GroupWise email server), a content server 134 for providing content such as Internet content or content from an organization's internal servers, and application servers 136 for implementing server-based applications such as instant messaging (IM) applications to mobile communication devices 103.

The wireless connector system 120 typically provides a secure exchange of data (e.g., email messages, personal information manager (PIM) data, and IM data) with the mobile communication devices 103. In some embodiments, communications between the wireless connector system 120 and the mobile communication devices 103 are encrypted. In some embodiments, communications are encrypted using a symmetric encryption key implemented using Advanced Encryption Standard (AES) or Triple Data Encryption Standard (Triple DES) encryption. Private encryption keys are generated in a secure, two-way authenticated environment and are used for both encryption and decryption of data. In some embodiments, the private encryption key is stored only in the user's mailbox on the messaging server 132 and on the mobile communication device 103, and can typically be regenerated by the user on mobile communication devices 103. Data sent to the mobile communication devices 103 is encrypted by the wireless connector system 120 using the private encryption key retrieved from the user's mailbox. The encrypted data, when received on the mobile communication devices 103, is decrypted using the private encryption key stored in memory. Similarly, data sent to the wireless connector system 120 from the mobile communication devices 103 is encrypted using the private encryption key stored in the memory of the mobile communication device 103. The encrypted data, when received on the wireless connector system 120, is decrypted using the private encryption key retrieved from the user's mailbox.

The wireless network gateway 110 is adapted to send data packets received from the mobile communication device 103 over the WWAN 102 to the wireless connector system 120. The wireless connector system 120 then sends the data packets to the appropriate connection point such as the messaging server 132 or content servers 134 or application server 136. Conversely, the wireless connector system 120 sends data packets received, for example, from the messaging server 132 or content servers 134 or application servers 136 to the wireless network gateway 110 that then transmit the data packets to the destination mobile communication device 103. The AP interfaces 116 of the WLAN 104 provide similar sending functions between the mobile communication device 103, the wireless connector system 120 and network connection point such as the messaging server 132, content server 134 and application server 136.

The network 124 may comprise a private local area network, metropolitan area network, wide area network, the public Internet or combinations thereof and may include virtual networks constructed using any of these, alone, or in combination. A mobile communication device 103 may alternatively connect to the wireless connector system 120 using a computer 117, such as desktop or notebook computer, via the network 124. A link 106 may be provided for exchanging information between the mobile communication device 103 and a computer 117 connected to the wireless connector system 120. The link 106 may comprise one or both of a physical interface and short-range wireless communication interface. The physical interface may comprise one or combinations of an Ethernet connection, Universal Serial Bus (USB) connection, Firewire™ (also known as an IEEE 1394 interface) connection, or other serial data connection, via respective ports or interfaces of the mobile communication device 103 and computer 117. The short-range wireless communication interface may be a personal area network (PAN) interface. A Personal Area Network is a wireless point-to-point connection meaning no physical cables are used to connect the two end points. The short-range wireless communication interface may comprise one or a combination of an infrared (IR) connection such as an Infrared Data Association (IrDA) connection, a short-range radio frequency (RF) connection such as one specified by IEEE 802.15.1 or the BLUETOOTH special interest group, or IEEE 802.15.3a, also referred to as UltraWideband (UWB), or other PAN connection.

It will be appreciated that the above-described communication system is provided for the purpose of illustration only, and that the above-described communication system comprises one possible communication network configuration of a multitude of possible configurations for use with the mobile communication devices 103. Suitable variations of the communication system will be understood to a person of skill in the art and are intended to fall within the scope of the present disclosure.

In example embodiments, the mobile communication device 103 is a two-way communication device having at least data and possibly also voice communication capabilities, and the capability to communicate with other computer systems, for example, via the public Internet. Depending on the functionality provided by the mobile communication device 103, in various embodiments the device may be, by way of example but not limitation, a data communication device, a multiple-mode communication device configured for both data and voice communication, a mobile telephone, a PDA (personal digital assistant) enabled for wireless communication, a smart phone, or a laptop computer with a wireless modem.

In some embodiments, the mobile communication device 103 is a handheld electronic device which includes a rigid case (not shown) for housing components of the device 103 and is configured to be held with one or two hands while the device 103 is in use. In some embodiments, the handheld electronic device is small enough to fit inside a purse or coat pocket or belt mounted holster.

Figure 2:
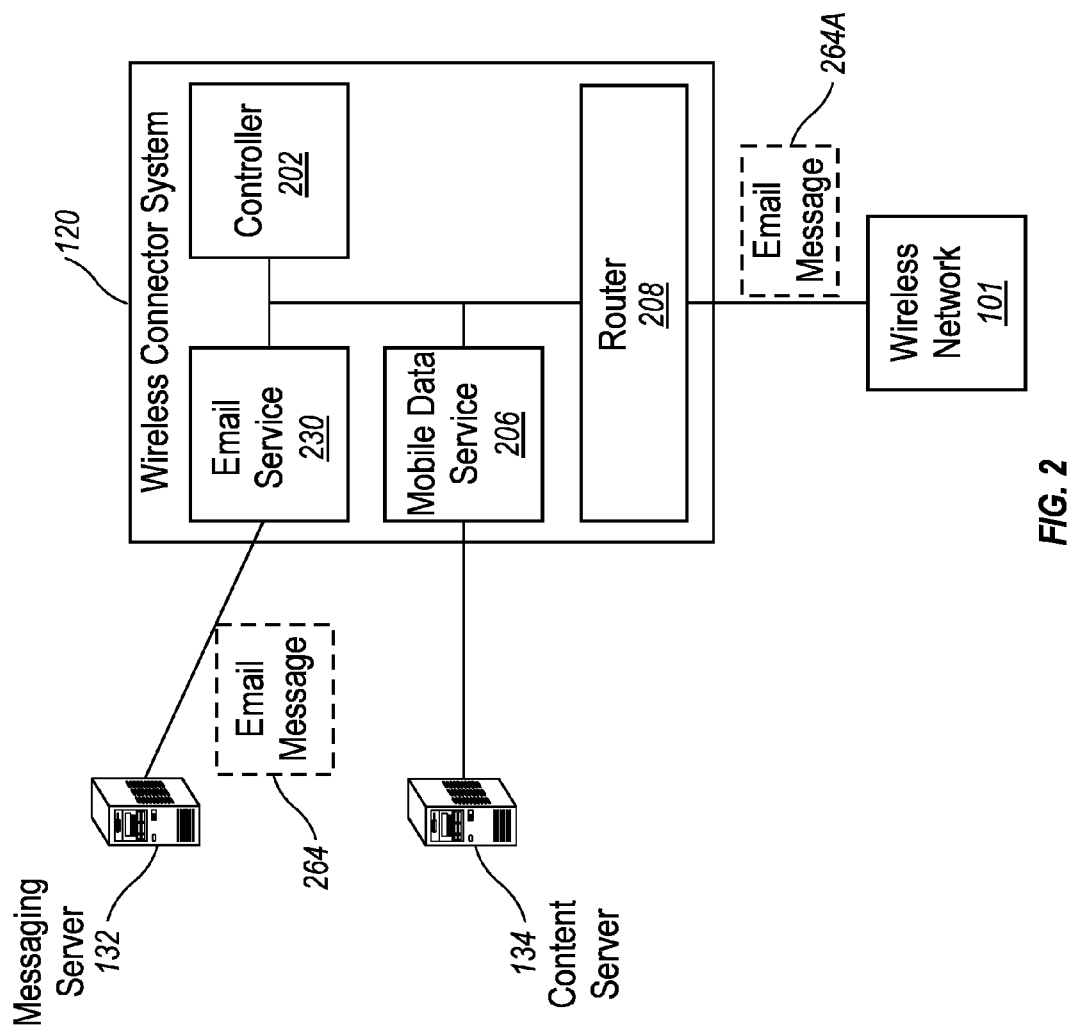
FIG. 2 illustrates a wireless connector system in accordance with one embodiment of the present disclosure.

Referring now to FIG. 2, the wireless connector system 120 for use in accordance with embodiments of the present disclosure will now be described in more detail. The wireless connector system 120 may be implemented using any known general purpose computer technology, and may, for example be realized as one or more microprocessor-based server computers implementing one or more server applications configured for performing the processes and functions described herein. The wireless connector system 120 is configured to implement a number of components or modules, including by way of non-limiting example, a controller 202, a mobile data service 206, a router 208 and an email service 230. The wireless connector system may include more of or fewer than the modules listed above. In one example embodiment, the wireless connector system 120 includes one or more microprocessors that operate under stored program control and execute software to implement these modules. The software may for example be stored in memory such as persistent memory.

Controller 202 monitors the various components or modules of the wireless connector system and restarts them if they stop working. The mobile data service 206 enables mobile communication devices 103 to access content available through content server 134, such as, but not limited to, web content, the Internet, and an organization's intranet and content servers. Router 208 connects to the wireless network 101 to send data to and from mobile communication devices 103. Email service 230 connects to messaging server 132 to provide messaging services, including processing message attachments that are sent to mobile communication devices 103.

The controller 202, email service 230, mobile data service 206, and router 208 modules may, among other things, each be implemented through stand-alone software applications, or combined together in one or more software applications, or as part of another software application. In some embodiments, the functions performed by each of the above identified modules may be realized as a plurality of independent elements, rather than a single integrated element, and any one or more of these elements may be implemented as parts of other software applications.

Together with the other modules described above, the email service 230 configures the wireless connector system 120 to perform, at least in part, the functions of a mobile email server and in this regard the wireless connector system 120 receives email messages 264 from messaging server 132, processes the received email messages for sending to mobile communication devices 103 in wireless network 101, and then sends the processed email messages 264A to the recipient devices 103.

Figure 3:
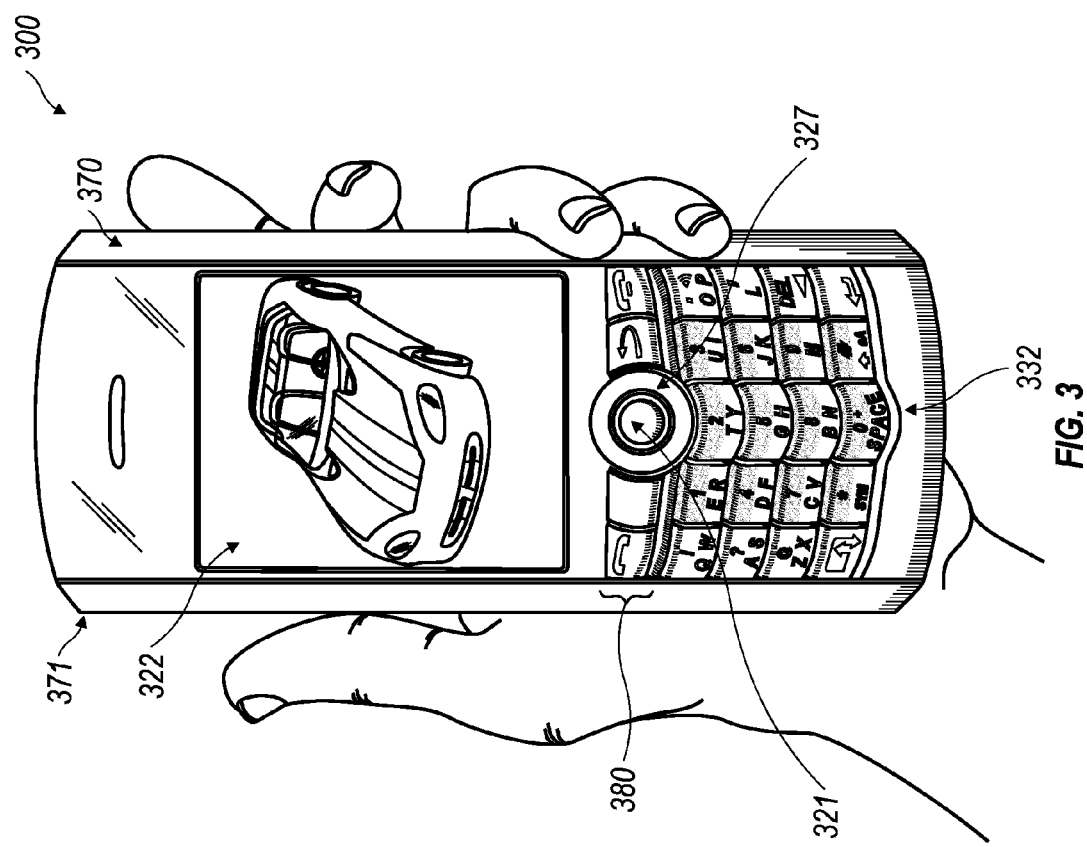
FIG. 3 illustrates an exemplary communication device used in embodiments of the present technology.
Figure 4:
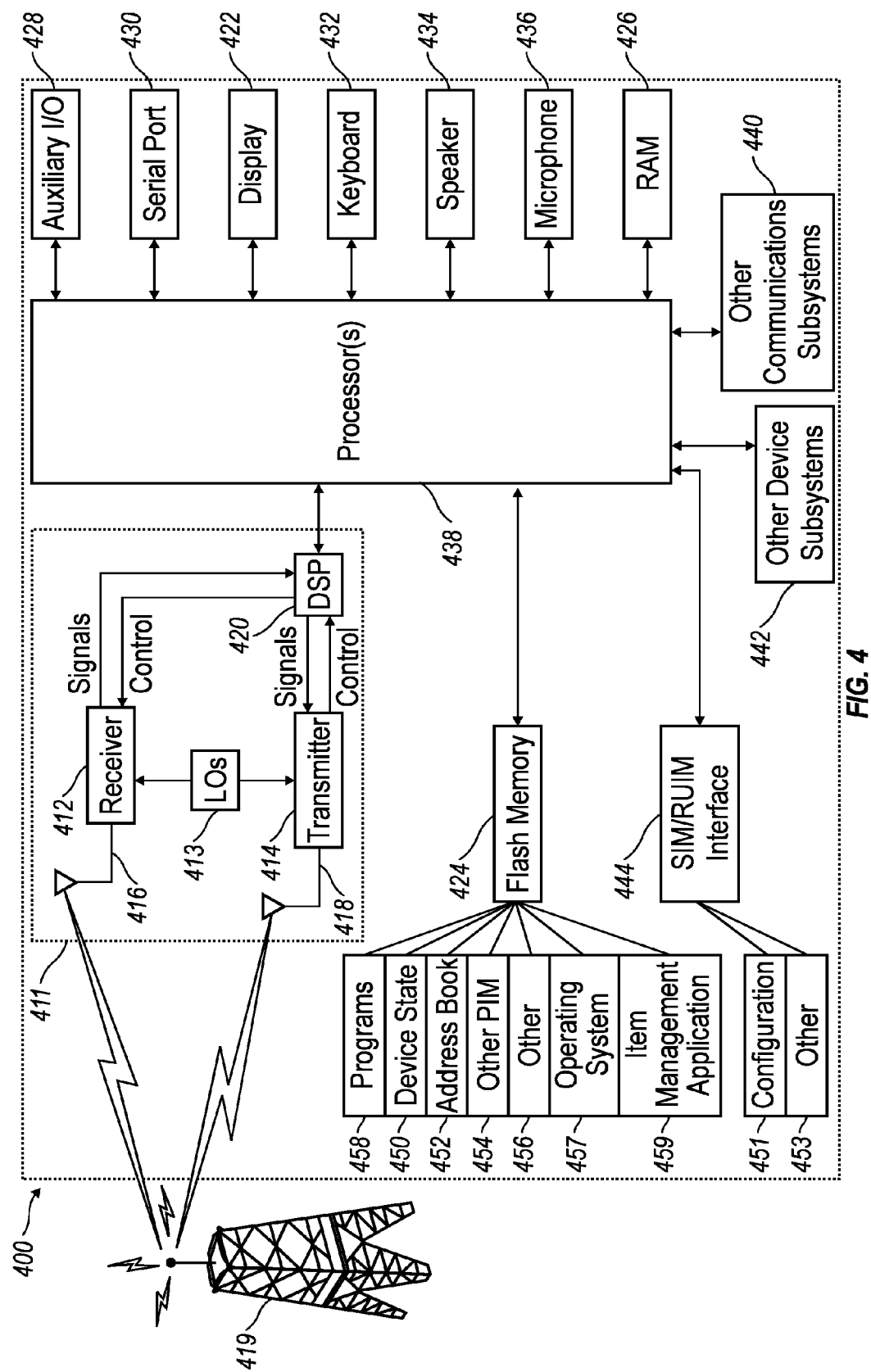
FIG. 4 illustrates a device, such as in FIG. 3, in detail.

As shown in FIG. 3, the exemplary communication devices 300 are communicatively coupled to a wireless network 419 as exemplified in the block diagram of FIG. 4. These figures are exemplary only, and those persons skilled in the art will appreciate that additional elements and modifications may be necessary to make the communication device 300 work in particular network environments. While in the illustrated embodiments, the communication devices 300 are smart phones, however, in other embodiments, the communication devices 300 may be personal digital assistants (PDA), laptop computers, desktop computers, servers, or other communication device capable of sending and receiving electronic messages.

Referring to FIG. 4, a block diagram of a communication device in accordance with an exemplary embodiment is illustrated. As shown, the communication device 400, such as 300, includes a microprocessor 438 that controls the operation of the communication device 400. A communication subsystem 411 performs all communication transmission and reception with the wireless network 419. The microprocessor 438 further can be communicatively coupled with an auxiliary input/output (I/O) subsystem 428 that can be communicatively coupled to the communication device 400. In at least one embodiment, the microprocessor 438 can be communicatively coupled to a serial port (for example, a Universal Serial Bus port) 430 that can allow for communication with other devices or systems via the serial port 430. A display 322, 422 can be communicatively coupled to microprocessor 438 to allow for displaying of information to an operator of the communication device 400. When the communication device 400 is equipped with a keyboard 432, the keyboard can also be communicatively coupled with the microprocessor 438. The communication device 400 can include a speaker 434, a microphone 436, random access memory (RAM) 426, and flash memory 424 all of which may be communicatively coupled to the microprocessor 438. Other similar components may be provided on the communication device 400 as well and optionally communicatively coupled to the microprocessor 438. Other communication subsystems 440 and other communication device subsystems 442 are generally indicated as being functionally connected with the microprocessor 438 as well. An example of a communication subsystem 440 is a short range communication system such as BLUETOOTH® communication module or a WI-FI® communication module (a communication module in compliance with IEEE 802.11b) and associated circuits and components. Additionally, the microprocessor 438 is able to perform operating system functions and enables execution of programs on the communication device 400. In some embodiments not all of the above components may be included in the communication device 400. For example, in at least one embodiment the keyboard 432 is not provided as a separate component and is instead integrated with a touchscreen as described below.

The auxiliary I/O subsystem 428 can take the form of a variety of different navigation tools (multi-directional or single-directional) such as a trackball navigation tool 321 as illustrated in the exemplary embodiment shown in FIG. 3, or a thumbwheel, a navigation pad, a joystick, touch-sensitive interface, or other I/O interface. These navigation tools may be located on the front surface of the communication device 400 or may be located on any exterior surface of the communication device 400. Other auxiliary I/O subsystems may include external display devices and externally connected keyboards (not shown). While the above examples have been provided in relation to the auxiliary I/O subsystem 428, other subsystems capable of providing input or receiving output from the communication device 400 are considered within the scope of this disclosure. Additionally, other keys may be placed along the side of the communication device 300 to function as escape keys, volume control keys, scrolling keys, power switches, or user programmable keys, and may likewise be programmed accordingly.

As may be appreciated from FIG. 3, the communication device 300 comprises a lighted display 322 located above a keyboard 332 constituting a user input and suitable for accommodating textual input to the communication device 300. The front face 360 of the communication device 300 has a navigation row 380. As shown, the communication device 300 is of unibody construction, also known as a "candy-bar" design.

The communication device 300 may include an auxiliary input that acts as a cursor navigation tool 327 and that may be also exteriorly located upon the front face 360 of the communication device 300. Its front face location allows the tool to be easily thumb-actuable like the keys of the keyboard 332. An embodiment provides the navigation tool 327 in the form of a trackball 321 that may be utilized to instruct two-dimensional screen cursor movement in substantially any direction, as well as act as an actuator when the trackball 421 is depressed like a button. The placement of the navigation tool 327 may be above the keyboard 432 and below the display screen 322; here, it may avoid interference during keyboarding and does not block the operator's view of the display screen 322 during use, e.g., as shown in FIG. 3.

As illustrated in FIG. 3, the communication device 300 may be configured to send and receive messages. The communication device 300 includes a body 371 that may, in some embodiments, be configured to be held in one hand by an operator of the communication device 300 during text entry. A display 322 is included that is located on a front face 370 of the body 371 and upon which information is displayed to the operator during text entry. The communication device 300 may also be configured to send and receive voice communications such as mobile telephone calls. The communication device 300 may also include a camera (not shown) to allow the user to take electronic photographs that can be referred to as photos or pictures.

Furthermore, the communication device 300 is equipped with components to enable operation of various programs, as shown in FIG. 4. In an exemplary embodiment, the flash memory 424 is enabled to provide a storage location for the operating system 457, device programs 458, and data. The operating system 457 is generally configured to manage other programs 458 that are also stored in memory 424 and executable on the processor 438. The operating system 457 honors requests for services made by programs 458 through predefined program 458 interfaces. More specifically, the operating system 457 typically determines the order in which multiple programs 458 are executed on the processor 438 and the execution time allotted for each program 458, manages the sharing of memory 424 among multiple programs 458, handles input and output to and from other device subsystems 442, and so on. In addition, operators can typically interact directly with the operating system 457 through a user interface usually including the keyboard 432 and display screen 422. While in an exemplary embodiment the operating system 457 is stored in flash memory 424, the operating system 457 in other embodiments is stored in read-only memory (ROM) or similar storage element (not shown). As those skilled in the art will appreciate, the operating system 457, device program 458 or parts thereof may be loaded in RAM 426 or other volatile memory.

When the communication device 400 is enabled for two-way communication within the wireless communication network 419, it can send and receive signals from a mobile communication service. Examples of communication systems enabled for two-way communication include, but are not limited to, the General Packet Radio Service (GPRS) network, the Universal Mobile Telecommunication Service (UMTS) network, the Enhanced Data for Global Evolution (EDGE) network, the Code Division Multiple Access (CDMA) network, High-Speed Packet Access (HSPA) networks, Universal Mobile Telecommunication Service Time Division Duplexing (UMTS-TDD), Ultra Mobile Broadband (UMB) networks, Worldwide Interoperability for Microwave Access (WiMAX), and other networks that can be used for data and voice, or just data or voice. For the systems listed above, the communication device 400 may use a unique identifier to enable the communication device 400 to transmit and receive signals from the communication network 419. Other systems may not use such identifying information. GPRS, UMTS, and EDGE use a Subscriber Identity Module (SIM) in order to allow communication with the communication network 419. Likewise, most CDMA systems use a Removable Identity Module (RUIM) in order to communicate with the CDMA network. The RUIM and SIM card can be used in multiple different communication devices 400. The communication device 400 may be able to operate some features without a SIM/RUIM card, but it will not be able to communicate with the network 419. A SIM/RUIM interface 444 located within the communication device 400 allows for removal or insertion of a SIM/RUIM card (not shown). The SIM/RUIM card features memory and holds key configurations 451, and other information 453 such as identification and subscriber related information. With a properly enabled communication device 400, two-way communication between the communication device 400 and communication network 419 is possible.

If the communication device 400 is enabled as described above or the communication network 419 does not use such enablement, the two-way communication enabled communication device 400 is able to both transmit and receive information from the communication network 419. The transfer of communication can be from the communication device 400 or to the communication device 400. In order to communicate with the communication network 419, the communication device 400 in the presently described exemplary embodiment is equipped with an integral or internal antenna 418 for transmitting signals to the communication network 419. Likewise the communication device 400 in the presently described exemplary embodiment is equipped with another antenna 416 for receiving communication from the communication network 419. These antennae (416, 418) in another exemplary embodiment are combined into a single antenna (not shown). As one skilled in the art would appreciate, the antenna or antennae (416, 418) in another embodiment are externally mounted on the communication device 400.

When equipped for two-way communication, the communication device 400 features a communication subsystem 411. As is understood in the art, this communication subsystem 411 is modified so that it can support the operational needs of the communication device 400. The subsystem 411 includes a transmitter 414 and receiver 412 including the associated antenna or antennae (416, 418) as described above, local oscillators (LOs) 413, and a processing module that in the presently described exemplary embodiment is a digital signal processor (DSP) 420.

It is contemplated that communication by the communication device 400 with the wireless network 419 can be any type of communication that both the wireless network 419 and communication device 400 are enabled to transmit, receive and process. In general, these can be classified as voice and data. Voice communication generally refers to communication in which signals for audible sounds are transmitted by the communication device 400 through the communication network 419. Data generally refers to all other types of communication that the communication device 400 is capable of performing within the constraints of the wireless network 419.

Example device programs that can depend on such data include email, contacts and calendars. For each such program synchronization with home-based versions on the programs can be desirable for either or both of their long term and short term utility. As an example, emails are often time sensitive, so substantially real time (or near-real time) synchronization may be desired. Contacts, on the other hand, can be usually updated less frequently without inconvenience. Therefore, the utility of the communication device 400 is enhanced when connectable within a communication system, and when connectable on a wireless basis in a network 419 in which voice, text messaging, and other data transfer are accommodated.

The keyboard 432 can include a plurality of keys that can be of a physical nature such as actuable buttons, or they can be of a software nature, typically constituted by virtual representations of physical keys on a display screen 422 (referred to herein as "virtual keys"). It is also contemplated that the user input can be provided as a combination of the two types of keys. Each key of the plurality of keys has at least one actuable action which can be the input of a character, a command or a function. In this context, "characters" are contemplated to exemplarily include alphabetic letters, language symbols, numbers, punctuation, insignias, icons, pictures, and even a blank space.

In the case of virtual keys, the indicia for the respective keys are shown on the display screen 422, which in one embodiment is enabled by touching the display screen 422, for example, with a stylus, finger, or other pointer, to generate the character or activate the indicated command or function. Some examples of display screens 422 capable of detecting a touch include resistive, capacitive, projected capacitive, infrared and surface acoustic wave (SAW) touchscreens.

Physical and virtual keys can be combined in many different ways as appreciated by those skilled in the art. In one embodiment, physical and virtual keys are combined such that the plurality of enabled keys for a particular program or feature of the communication device 400 is shown on the display screen 422 in the same configuration as the physical keys. Using this configuration, the operator can select the appropriate physical key corresponding to what is shown on the display screen 422. Thus, the desired character, command or function is obtained by depressing the physical key corresponding to the character, command or function displayed at a corresponding position on the display screen 422, rather than touching the display screen 422.

Terminal devices, such as mobile devices 103 and 300, receive information and services via wireless connector systems, e.g., 120 from sources such as content servers 134, application servers 136, and messaging servers 132.

While technology exists to certify the trustworthiness of such sources, such technology presents several disadvantages, including, introducing latency and processing overhead, not being so ubiquitously available (or compatible across platforms) as to encompass all trusted sources; requiring involvement of other servers.

Terminal devices typically contain information personal to the device user(s), e.g., e-mail, calendar information, contact information, geolocation history, media (including audio, video, and photo content and metadata), settings and preferences, short messaging, instant messaging, and browser history, which may provide context for information and services from sources. Information owners, e.g., a device user, typically are reluctant to share raw personal information with sources, but would welcome receiving information and services that are more targeted to the information owner's context.

Some approaches to leveraging user information allow sources to collect information personal to the user in datastores external to the device. For example, the Gmail™ web mail service from Google, Inc. stores an account holder's e-mail in servers independent of the user's terminal device. Google scans e-mails to add context-sensitive advertisements and has the ability to combine information contained in a person's e-mail messages with information from Internet searches.

Embodiments of the present technology abstract information present on the terminal device in a fashion that can be used by a source to provide information and services more relevant to the context of the user and the device. In some embodiments, the information is not on the terminal device, but on a device under the control of the terminal device. Using an abstract of the information on the device, or off the device in a location controlled by the device, reduces the likelihood that the information owner's privacy will be compromised.

If a user considers the service(s) offered by the source to be useful, the user may be willing to trade either privacy/security (in the case of an untrusted source), or the transaction cost associated with dealing with a trusted source, for utility. But such tradeoffs are typically all-or-nothing. A user is more likely to engage with an untrusted or semi-trusted source if the user can retain some control over data passed to the source, e.g., as with embodiments of the present technology.

Figure 5:
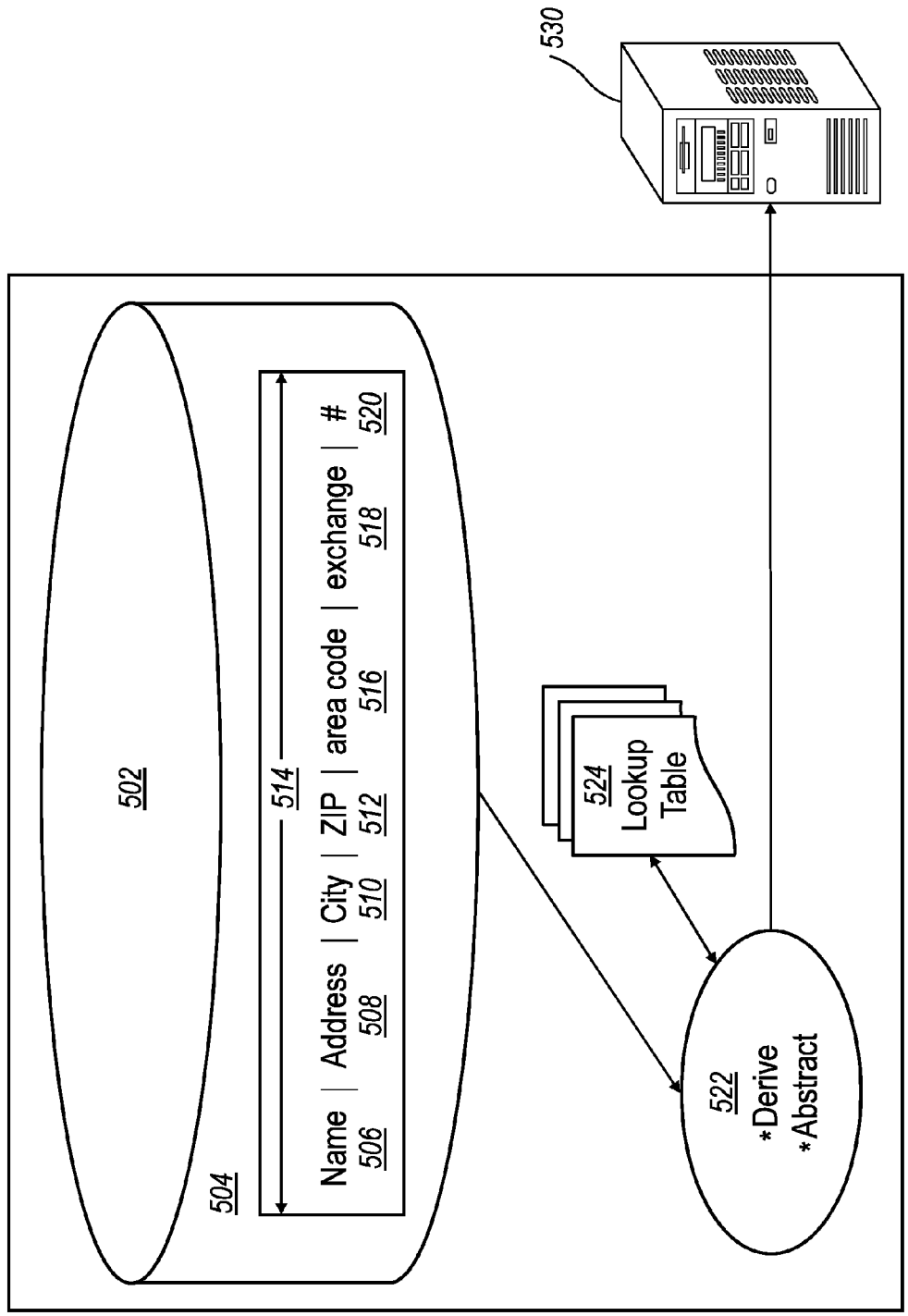
FIG. 5 illustrates embodiments of the technology in relation to a server.

Referring to FIG. 5, an exemplary embodiment of the present technology is shown. Device 500, e.g., device 103, 300, 400, comprises a datastore 502 such as an address book 452. The datastore 502 can contain records 504, each comprising fields including name 506, street address 508, city 510, ZIP code 512, and phone number 514. The phone number field 514 can be subdivided into area code 516, exchange 518, and the remainder of the phone number 520. Examples of other datastores that can be used in embodiments of the technology include: browser history, bookmarks, search history, location tract data (where the user went), and purchase history from digital wallet.

A computer program product 522 of the present technology can retrieve information from the datastores 502. Such information can be explicit, e.g., city 510, from an address book 452. Such information can also be derived from datastore information. For example, the technology can derive city, or at least metropolitan area, from either area code 516 or ZIP code 512, e.g., where the datastore 502 does not contain explicit city information for the contact.

In either event, the technology can abstract the explicitly retrieved or derived information. In the example address book 452 of Table 1, the technology can explicitly retrieve city information from record numbers 1, 3, 4, and 6-10. The technology can derive city information from record number 2 using a lookup table 524 relating area codes to cities; in the case of record 2, area code "202" relates to Washington, D.C. The technology can also derive city information from record number 5 using a ZIP code lookup table 524 relating "20005" to Washington, D.C. In this case, the technology abstracts: Boston, Mass. 50%, Washington, D.C. 40%, and New York, N.Y. 10%.

TABLE 1

| Rec. No. | Contact Name | Street Address | City | ZIP Code | Phone No. |
| --- | --- | --- | --- | --- | --- |
| 1 | B. Obama | 1600 Penn. Ave. NW | Washington, DC | | (202)123-4567 |
| 2 | R. Gephardt | Observatory Circle | | | (202)555-1212 |
| 3 | S. Adams | | Boston, MA | | (617)617-6171 |
| 4 | K. Garnett | | Boston, MA | | |
| 5 | Alex Ovechkin | | | 20005 | |

TABLE 1-continued

| Rec. No. | Contact Name | Street Address | City | ZIP Code | Phone No. |
|---|---|---|---|---|---|
| 6 | G. Arenas | | Washington, DC | | (202)987-6543 |
| 7 | S. Malone | Cheers | Boston, MA | | |
| 8 | D. Trump | | New York, NY | | |
| 9 | P. Revere | | Boston, MA | | (857)975-3100 |
| 10 | J. Adams | | Boston, MA | | (857)246-8100 |

The technology can use the abstracted information in several ways. In one way, the abstracted information can be provided to a server 530 external to the device 502. In another example, the abstracted information can be provided to an application on the device, e.g., an untrusted application. In some embodiments, abstracted information is provided accompanying a request 540 by the device 502 to a server 530 such as e-mail server (e.g., 132), a search engine, or a geographic information system (GIS) server. In some embodiments, abstracted information is provided to a server 530 for storage off the terminal device 500. In these embodiments, the abstracted information can be provided periodically, e.g., upon request from the server 530, upon events recognized by the device 500 (e.g., a change in the datastore), by the device upon a prompt from a user, or by a combination of the above methods.

In the example of Table 1, the abstracted information can be used to target the user with discount air and rail transportation between Boston, Mass. and Washington, D.C., restaurants and hotels in Washington, D.C.—each on the assumption that address books contain more local addresses than other addresses, and that a user is likely to regularly visit a city/region with the second-most addresses.

Referring to FIG. 6, a method of the technology 600 is illustrated. In this method, the technology (e.g., a computer program product executing on the device 500) obtains information 602 from a datastore 502 of the device. For information that is not explicit, e.g, area code representing location information, the technology derives 604 the desired information from the explicit information, e.g., using lookup tables 524, tables external to the device (e.g., in a fashion similar to a geocoding server).

The technology then abstracts 606 the explicit information. The technology sends 608 the information off the device 500, thereby providing abstracted personal information less likely to compromise a device user's privacy.

In summary, in some embodiments, the technology can be a computer implemented method, a computer program product, or a system for requesting from a device to a source. The device can include a datastore comprising a plurality of records. Information responsive to a query directed to the plurality of records is retrieved. At least a subset of the retrieved information is abstracted. The abstracted information is sent to the source from the device in place of the retrieved information. The datastore can be an address book, and abstracting can include identifying a frequency of occurrence of at least one region value identified in the address book. The frequency of occurrence of a region value can be expressed as the percentage of retrieved information and abstracted information having that value. In some embodiments, sending of abstracted information is at the time of a request.

The present technology can take the form of hardware, software or both hardware and software elements. In some embodiments, the technology is implemented in software, which includes but is not limited to firmware, resident software, microcode, an FPGA or ASIC, etc. In particular, for real-time or near real-time use, an FPGA or ASIC implementation is desirable.

Furthermore, the present technology can take the form of a computer program product comprising program modules accessible from computer-usable or computer-readable medium storing program code for use by or in connection with one or more computers, processors, or instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium (though propagation mediums in and of themselves as signal carriers are not included in the definition of physical computer-readable medium). Examples of a physical computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. Both processors and program code for implementing each as aspect of the technology can be centralized or distributed (or a combination thereof) as known to those skilled in the art.

A data processing system suitable for storing a computer program product of the present technology and for executing the program code of the computer program product will include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input/output or I/O devices (including but not limited to keyboards, displays, pointing devices, etc.) can be coupled to the system either directly or through intervening I/O controllers. Network adapters can also be coupled to the system to enable the data processing system to become coupled to other data processing systems or remote printers or storage devices through intervening private or public networks. Modems, cable modem and Ethernet cards are just a few of the currently available types of network adapters. Such systems can be centralized or distributed, e.g., in peer-to-peer and client/server configurations. In some embodiments, the data processing system is implemented using one or both of FPGAs and ASICs.

The invention claimed is:

1. A computer-implemented method for requesting from a mobile device to a source, the method comprising:
   in a mobile device comprising a datastore, the datastore comprising a plurality of personal records:

periodically retrieving information responsive to a query directed to the plurality of personal records;
abstracting at least a subset of the retrieved information, resulting in abstracted information, wherein abstracting includes identifying a frequency of occurrence of at least one region value in the plurality of personal records based on a name, a street address, a city, an area code and a phone number, wherein at least one region value is cross-referenced for missing region value information with information in a lookup table of the mobile device, wherein the abstracted information is non-personal and includes the identified frequency of occurrence; and
periodically sending, to the source, the abstracted non-personal information from the mobile device in place of the retrieved information,
wherein the datastore is an address book, and
the frequency of occurrence is that of at least one region value identified in the address book and is a percentage of occurrence of the at least one region value in relation to the other region values in the address book.

2. The method of claim 1, wherein:
sending comprises sending at the time of a request.

3. A computer-implemented method for forming a request from a mobile device, the method comprising:
in a mobile device comprising a datastore, the datastore comprising a plurality of personal records:
periodically retrieving information responsive to a query directed to the plurality of personal records;
deriving information from a subset of fields across a subset of the personal records;
abstracting at least a subset of the retrieved information and subset of the derived information, resulting in abstracted information, wherein the abstracted information is non-personal and includes is a value corresponding to a frequency of occurrence of the retrieved information based on a name, a street address, a city, an area code and a phone number, wherein at least one region value is cross-referenced for missing region value information with information in a lookup table of the mobile device; and
sending, to the source, the abstracted non-personal information from the mobile device in place of the retrieved information,
wherein the datastore is an address book, and
the frequency of occurrence is that of at least one region value identified in the address book and is a percentage of occurrence of the at least one region value in relation to the other region values in the address book.

4. The method of claim 3, wherein:
sending comprises sending at the time of a request.

5. A computer program product for requesting from a mobile device to a source, the computer program product comprising:
a non-transitory computer readable media on the device;
the device comprising a datastore, the datastore comprising a plurality of personal records:
a client programming module:
stored on the media, and
operative to:
retrieve information responsive to a query directed to the plurality of personal records;
abstract at least a subset of the retrieved information, resulting in abstracted non-personal information, wherein the abstracted non-personal information is a value corresponding to a frequency of occurrence of the retrieved information based on a name, a street address, a city, an area code and a phone number, wherein at least one region value is cross-referenced for missing region value information with information in a lookup table of the mobile device; and
send, to the source, the abstracted non-personal information from the mobile device in place of the retrieved information,
wherein the datastore is an address book, and
the frequency of occurrence is that of at least one region value identified in the address book and is a percentage of occurrence of the at least one region value in relation to the other region values in the address book.

6. The computer program product of claim 5, wherein:
sending comprises sending at the time of a request.

7. A computer program product for requesting from a mobile device to a source, the computer program product comprising:
a non-transitory computer readable media on the mobile device;
the device comprising a datastore, the datastore comprising a plurality of personal records, each record comprising a plurality of fields:
a client programming module:
stored on the media, and
operative to:
periodically retrieve information responsive to a query directed to the plurality of personal records;
derive information from a subset of the fields across a subset of the personal records;
abstract at least a subset of the retrieved information and subset of the derived information, resulting in abstracted non-personal information, wherein the abstracted non-personal information is a value corresponding to a frequency of occurrence of the retrieved information based on a name, a street address, a city, an area code and a phone number, wherein at least one region value is cross-referenced for missing region value information with information in a lookup table of the mobile device; and
send, to the source, the abstracted non-personal information from the mobile device in place of the retrieved information,
wherein the datastore is an address book, and
the frequency of occurrence is that of at least one region value identified in the address book and is a percentage of occurrence of the at least one region value in relation to the other region values in the address book.

8. The computer program product of claim 7, wherein:
sending comprises sending at the time of a request.

9. A system for requesting from a mobile device to a source, the system comprising:
a non-transitory computer readable media on the mobile device;
the device comprising a datastore, the datastore comprising a plurality of personal records:
a client programming module:
stored on the media, and
operative to:
periodically retrieve information responsive to a query directed to the plurality of personal records;
abstract at least a subset of the retrieved information, resulting in abstracted non-personal information, wherein the abstracted non-personal information is a value corresponding to a frequency of occurrence of the retrieved information based on a name, a street address, a city, an area code and a phone number, wherein at least one region value is cross-referenced for missing region value information with information in a lookup table of the mobile device; and send, to the source, the abstracted non-personal information from the device in place of the retrieved information, wherein the datastore is an address book, and the frequency of occurrence is that of at least one region value identified in the address book and is a percentage of occurrence of the at least one region value in relation to the other region values in the address book.

10. The system of claim 9, wherein:

sending comprises sending at the time of a request.

11. A system for requesting from a mobile device to a source, the system comprising:

a mobile device;

a non-transitory computer readable media on the mobile device;

the mobile device comprising a datastore, the datastore comprising a plurality of personal records:

a client programming module:
stored on the media, and
operative to:

periodically retrieve information responsive to a query directed to the plurality of personal records;

derive information from a subset of the fields across a subset of the personal records;

abstract at least a subset of the retrieved information and subset of the derived information, resulting in abstracted non-personal information, wherein the abstracted non-personal information is a value corresponding to a frequency of occurrence of the retrieved information based on a name, a street address, a city, an area code and a phone number, wherein at least one region value is cross-referenced for missing region value information with information in a lookup table of the mobile device; and periodically send, to the source, the abstracted non-personal information from the mobile device in place of the retrieved information, wherein the datastore is an address book, and the frequency of occurrence is that of at least one region value identified in the address book and is a percentage of occurrence of the at least one region value in relation to the other region values in the address book.

12. The system of claim 11, wherein:

sending comprises sending at the time of a request.

* * * * *